(12) United States Patent
Gutiérrez Fernández

(10) Patent No.: US 7,073,635 B2
(45) Date of Patent: Jul. 11, 2006

(54) DEVICE FOR ACTUATING A CABLE

(75) Inventor: José Manuel Gutiérrez Fernández, Santander (ES)

(73) Assignee: Edscha Betaetigungssysteme GmbH, Hengersberg (DE)

( * ) Notice: Subject to any disclaimer, the term of this patent is extended or adjusted under 35 U.S.C. 154(b) by 0 days.

(21) Appl. No.: 10/487,583

(22) PCT Filed: Aug. 22, 2002

(86) PCT No.: PCT/DE02/03082

§ 371 (c)(1),
(2), (4) Date: Feb. 23, 2004

(87) PCT Pub. No.: WO03/019021

PCT Pub. Date: Mar. 6, 2003

(65) Prior Publication Data
US 2004/0200673 A1   Oct. 14, 2004

(30) Foreign Application Priority Data
Aug. 24, 2001  (DE) ............................... 101 41 508

(51) Int. Cl.
*F16F 65/14* (2006.01)

(52) U.S. Cl. ...................................... 188/2 D; 74/518

(58) Field of Classification Search .............. 188/2 D, 188/265; 74/500.5, 502.5, 502.6, 503, 516, 74/518
See application file for complete search history.

(56) References Cited

U.S. PATENT DOCUMENTS

| | | | | |
|---|---|---|---|---|
| 3,730,318 A | | 5/1973 | Camp | 192/99 |
| 3,938,407 A | * | 2/1976 | Nisbet | 74/516 |
| 4,270,406 A | * | 6/1981 | Lipshield et al. | 74/516 |
| 4,649,766 A | | 3/1987 | Kiekhaefer | 74/475 |
| 4,914,971 A | | 4/1990 | Hinkens et al. | 74/502.2 |
| 5,065,643 A | | 11/1991 | Axtell | 74/501.6 |
| 5,125,307 A | * | 6/1992 | Jackson | 83/605 |
| 5,245,886 A | | 9/1993 | Truesdell et al. | 74/501.6 |
| 5,280,734 A | * | 1/1994 | Riffle et al. | 74/516 |
| 5,660,082 A | | 8/1997 | Hsieh | 74/502.2 |
| 5,832,784 A | * | 11/1998 | McCallips et al. | 74/512 |
| 5,979,266 A | | 11/1999 | Nagano | 74/502.2 |

FOREIGN PATENT DOCUMENTS

| | | |
|---|---|---|
| FR | 2611832 | 3/1987 |
| FR | 2768679 | 9/1997 |

* cited by examiner

*Primary Examiner*—James McClellan
*Assistant Examiner*—Bradley King
(74) *Attorney, Agent, or Firm*—Davidson, Davidson & Kappel, LLC

(57) ABSTRACT

A device for actuating a cable includes a lever pivotable about an axis, a connecting device for connecting the cable in an extension-resistant manner to the lever at a distance from the axis, the distance being decreased by pivoting the lever. The connecting device includes a traction rod having a variable length. A slideway is arranged on the lever transversely to the traction rod and has a profile in the form of a curve. The device also includes a sliding component for coupling the traction rod and the slideway, a device for reducing an effective length of the connecting device, a guide device arranged at the lever, and a shaped part for guiding the traction rod and coupled to the guide device.

23 Claims, 2 Drawing Sheets

DEVICE FOR ACTUATING A CABLE

BACKGROUND

The invention relates to a device for actuating a cable, comprising a lever which can be pivoted about an axis, a connecting device for connecting the cable pull in an extension-resistant manner to the lever at a distance from the axis which is decreased by pivoting of the lever, and a device for reducing the effective length of the connecting device.

Actuation devices of this type can be used for a wide variety of purposes. In motor vehicles, they are used, for example, for actuating a parking brake. The parking brake is conventionally referred to as a hand brake because it is generally actuated via a hand lever. However, at the same time, foot-actuated parking brakes are also known. The actuation of a brake of this type takes place via a cable, which, however, becomes stretched over the service life of the motor vehicle, or, due to the brake linings becoming worn, the actuating travel changes. If, as a consequence of this stretching, the pivoting of the actuating lever exceeds a permissible angular size, the cable of the brake actuating means has to be reset.

U.S. Pat. No. 5,660,082 shows a device for actuating a cable pull, having a one-armed lever which can be pivoted about an axis, a connecting device for connecting the cable pull in an extension-resistant manner to the lever at a distance from the pivot axis of the lever, in which a U-shaped part having a constant active length is used as the connecting device. The lever has a slotted guide link which is of rectilinear design and in which a coupling element which is connected in an extension-resistant manner to the cable pull is mounted, and the coupling element is guided in the slotted guide link in such a manner that it is displaced, as the lever pivots, in the slotted guide link and decreases its distance from the pivot axis of the lever. A catch which can be adjusted by means of a rotary screw is arranged in the slotted guide link and limits the movement of the coupling element in the slotted guide link when the brake device is actuated. One disadvantage of this type of brakes is that there is no possibility of changing the active length of the cable in order therefore to change the length of the cable pull. This is necessary, for example, if the cable pull has become extended due to the duration of use. In order to compensate for this extension, in the case of the parking brake indicated in said document, a catch is provided for changing the pivoting option of the coupling element, but this has the effect of therefore also changing the pivoting region of the lever and thus, depending on the duration of use of the brake, the actuator has to adjust itself to provide a new performance of the brake. A further disadvantage is that the coupling element of the traction cable is guided in a slotted guide link which results in severe stressing of the coupling element and it is therefore subjected to severe abrasion.

Previously a steel cable which was guided by a roller was used as the traction element. This inevitably led to the traction element being subjected to a bending stress which was repeated on each actuation of the handbrake or the like, reduced the fatigue strength and finally ended with the steel cable breaking and therefore with the failure of the brake.

FR 2 611 832 A3 shows a device for actuating a cable pull with a lever and with a device connecting the cable pull to the lever, the connecting device being designed as a traction rod having a variable active length, so that the effective length of the connecting device can be reduced. A disadvantage of this type of brake device is the fact that the traction rod is connected directly to the lever and therefore, when the brake is actuated, a rubbing effect is produced between the traction rod and the lever, which results in a relatively rapid abrasion of the traction rod.

The previous structural design also had the consequence that a structural space of a certain volume had to be available for the pivoting of the actuating lever connected to the cable pull.

U.S. Pat. No. 5,979,266 shows a device for actuating a cable pull with a lever and a device for connecting the cable pull to the lever. The connecting device comprises a cam driver which is guided in a curved slotted guide link and a cable fastening ring for the attachment of the brake cable. Furthermore, a device for setting the starting position of the lever is provided.

SUMMARY OF THE INVENTION

An object of the present invention is to provide a device for actuating a cable, in which the service life is considerably extended and the structural space which is required is smaller.

The present invention provides a device for actuating a cable that includes a lever pivotable about an axis, a connecting device for connecting the cable in an extension-resistant manner to the lever at a distance from the axis, the distance being decreased by pivoting the lever, the connecting device including a traction rod having a variable length. A slideway is arranged on the lever transversely to the traction rod and has a profile in the form of a curve. In addition, the device includes a sliding component for coupling the traction rod and the slideway, a device for reducing an effective length of the connecting device, a guide device arranged at the lever, and a shaped part for guiding the traction rod and coupled to the guide device.

In the actuating device, the invention avoids the use of a cable pull, and therefore the risk of it breaking as a consequence of bending loads which are constantly repeated. In order, furthermore, to avoid abrasion of the traction rod, the latter is guided in a shaped part which is guided by means of a guide device arranged on the lever. Furthermore, the volume of the structural space which is required decreases, since, when the lever is pivoted, the sliding component is displaced in the direction of the axis of rotation, i.e., an outer pivoting region is not required.

In addition, resetting can easily be carried out, since the length-variable traction rod which is provided is readily accessible in the vicinity of the end of the lever.

The last-mentioned advantage can be obtained in a particularly simple manner by the traction rod, preferably at the end, having a screw thread which interacts with a screw nut. However, a kinematically reversed arrangement is also possible. The traction rod is then designed as a screw nut into which a screw can be screwed. The screw head then takes the place of the screw nut used here.

The invention is implemented in a reliable and simple manner if the sliding component is penetrated by the screw thread of the traction rod and is held against the slideway by the screw nut. In order to shorten the overall length, the sliding component can have a depression for accommodating at least part of the screw nut. For increased security against becoming detached even upon vibration and the like, the screw nut is of self-locking design.

For smooth-running actuation, it is appropriate for the sliding component to consist at least on its sliding surfaces of a material which is low in sliding friction, for example bronze or plastic, such as polyamide. A secure and long-lasting installation is improved by guide or retaining means being provided on the slideway and/or on the sliding component which prevent lifting of and/or longitudinal displacement of the sliding component relative to the slideway.

One possible way of bringing about the abovementioned securing against rotation or longitudinal displacement is for the slideway to comprise two slideways which are divided by a central longitudinal slot. In the last-mentioned case, the sliding component can have sliding surfaces which interact in a sliding manner firstly with the two slideways to the side of the slot and secondly also with the slot itself, i.e., with its inner walls.

For the secure installation and for the long-lasting, but slidable retention, but also for the purpose of easy exchange, the sliding component can contain guide projections or the like which engage laterally around the slideway or slideways and the ends of which grip behind the slideway or slideways as fastening clips.

In an advantageous manner, the slideway should not have a rectilinear profile, but rather a profile in the form of a curve. To this end, it is appropriate for the curve to constitute a part-circle.

For an improved sliding action, the sliding component should have at least one sliding surface which interacts with the slideway and constitutes a curve or a part-circle, the curvature of said curve being equal to or greater than the slideway, or the radius of said part-circle being equal to or smaller than the slideway.

A very stable and compact design of the device can be obtained if the lever is of U-shaped design in cross section. It can then preferably be bent from steel sheet. In this case, the slideway can preferably be situated on the outside of the U-web.

To further facilitate the resetting, namely without a second tool, the traction rod is guided in the shaped part in a longitudinally displaceable, but nonrotatable manner, and guide means are arranged on the shaped part and, as the lever pivots, interact in a slidable manner with corresponding guide means on the insides of the U-limbs, but prevent the shaped part from rotating. These guide means can be designed, in particular, in such a manner that the shaped part or the U-limbs engage by means of guide cams in guide grooves of the U-limbs or of the shaped part.

In the above case, the guide grooves are provided with a profile which is parallel with respect to the axis of rotation and is similar to the slideway for the sliding component, i.e., the curved profile of the slideway on the U-limb is congruent with the curved profile of the guide means or guide grooves on the limbs.

To reduce the sliding friction, the shaped part is formed, or at least its guide means are formed, from a slidable plastic, such as polyamide, silicone or the like. Finally, optimum utilization of space is obtained if the angle between the effective lever arm of the lever and the traction rod is approximately 90°+/−10° in the starting position and approximately 30°+/−5° in the end position.

BRIEF DESCRIPTION OF THE DRAWINGS

The drawing illustrates an exemplary embodiment of the invention which will now be described in greater detail.

DETAILED DESCRIPTION

Figure 1:
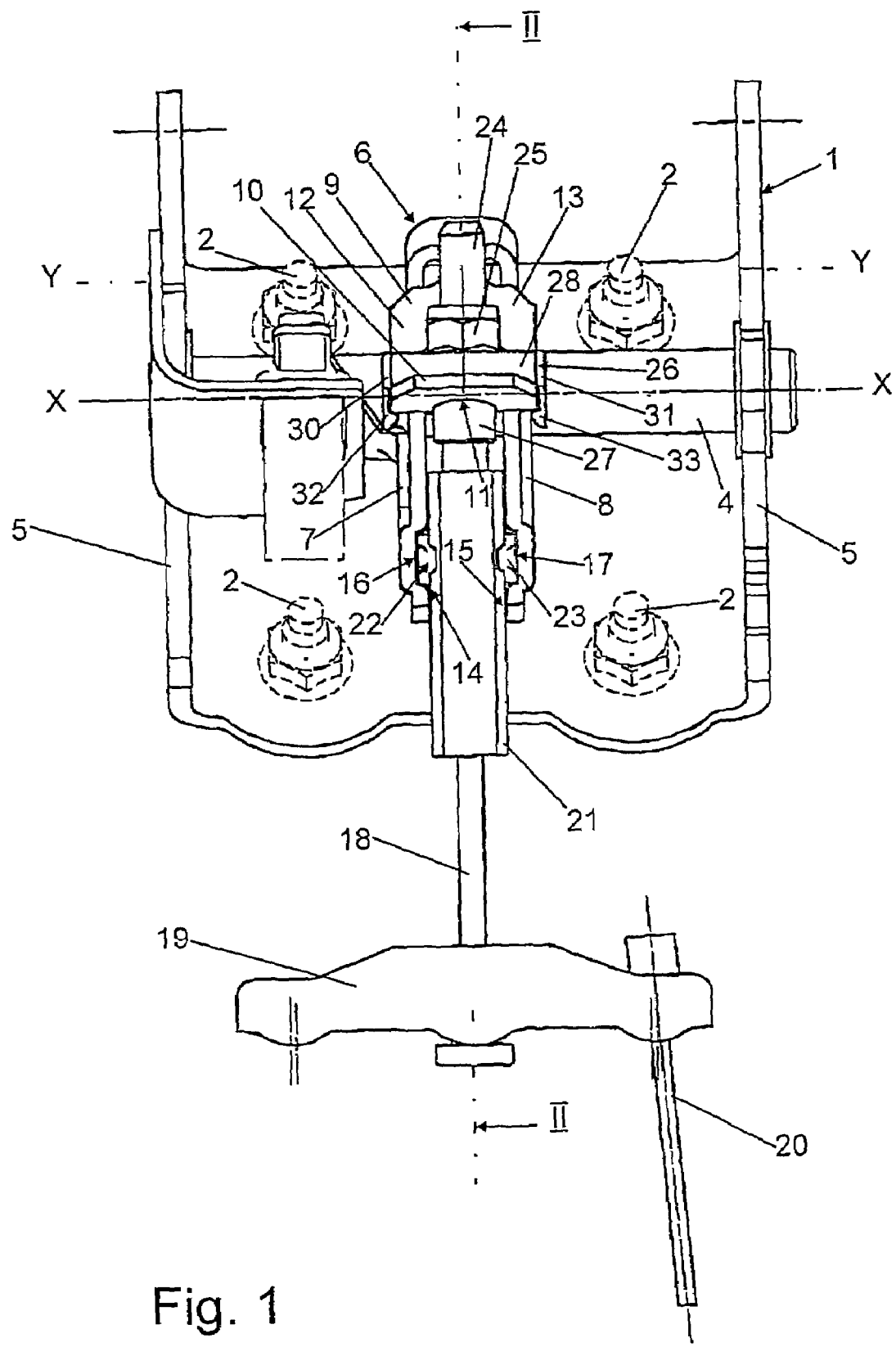
FIG. 1 shows a plan view of a device for actuating a handbrake.
Figure 2:
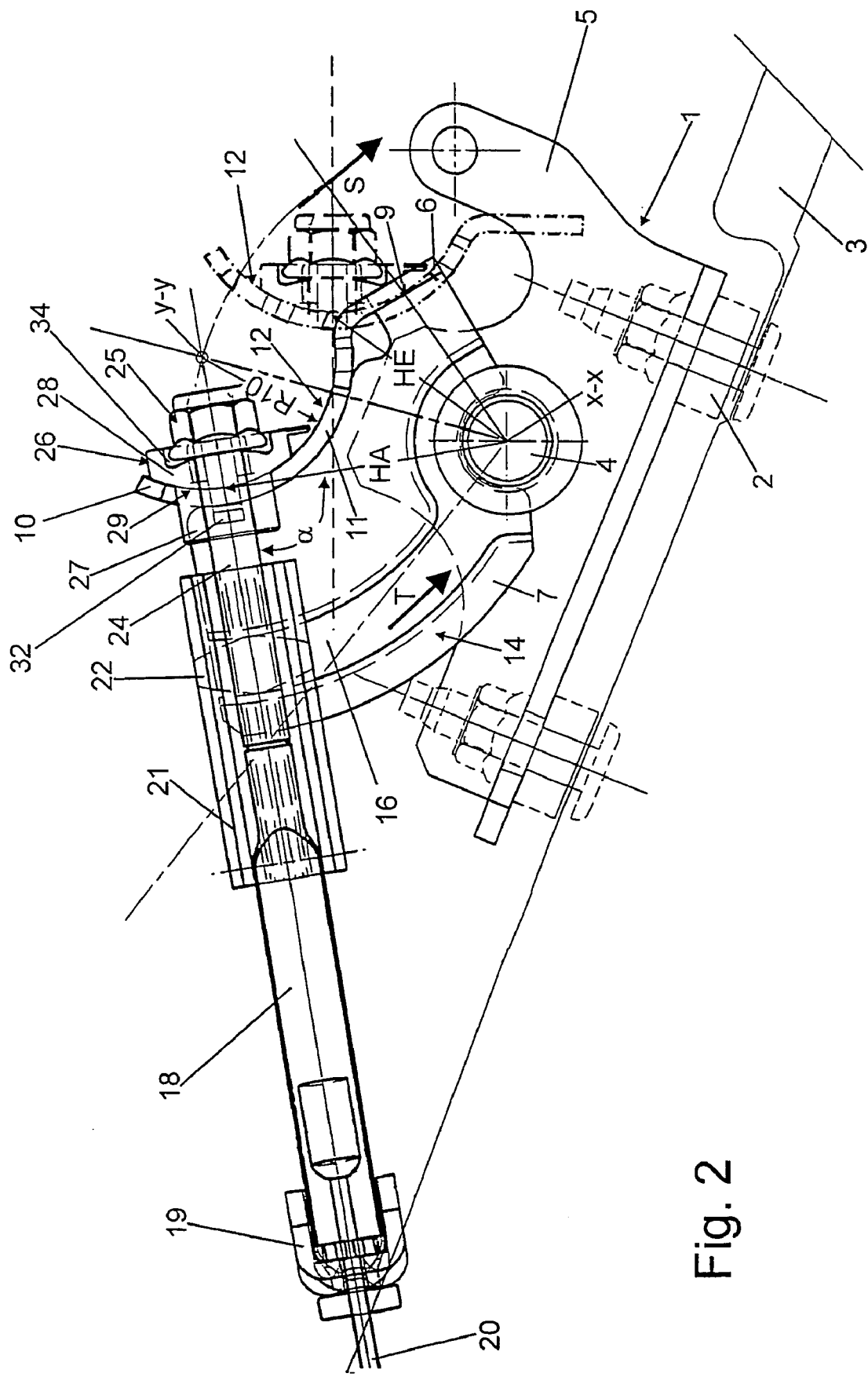
FIG. 2 shows the section II—II in FIG. 1, on a slightly enlarged scale.

The device comprises a U-shaped holder 1 which is fastened on the floor 3 of a motor vehicle by four screws 2. The holder 1 comprises an axle bolt 4 which is mounted in a non-displaceable manner in the side walls 5 of the holder 1 but in a manner such that it can be rotated about the axis X—X. A handbrake lever (not illustrated) is connected rigidly to the bolt 4.

Furthermore, a lever 6 is connected in a rotationally fixed manner to the bolt 4. The lever 6 consists of steel sheet, is bent in a U-shaped manner in cross section and is welded at its lower ends of its limbs 7 and 8 to the bolt 4. The U-web 9 of the lever 6 has, on the outside, a cylindrical deflection 10 which is in the form of a part-circle in the upper region and has the radius R10. A central, closed slot 11 is placed in the deflection 10. Slideways 12 and 13 which are likewise in the form of a part-circle and are bent cylindrically extend on both sides of the slot 11.

Guide grooves 16 and 17 are placed on the insides 14 and 15 of the limbs 7 and 8. The guide grooves 16 and 17 run completely parallel to the deflection 10, i.e., are likewise designed in the form of a part-circle and cylindrically, and have the same center point of the circle as the deflection 10. The corresponding axis of the deflection 10, of the slideways 12 and 13 and of the guide grooves 16 and 17 is indicated by Y—Y.

The device furthermore comprises a traction rod 18 which is tractively connected to a beam 19. Cable pulls 20 which are used for actuating parking brakes (not shown) are attached to the beams 19. The traction rod 18 is guided in a longitudinally moveable but nonrotatable manner by a shaped part 21 consisting of slideable plastic. The shaped part 21 engages in the sliding manner by means of lateral, slightly oval guide cams 22 and 23 in the guide grooves 16 and 17.

The traction rod 18 contains, at its free, right end, a screw thread 24 which passes through the slot 11 and ends with a screw nut 25. Between the screw nut 25 and the slot 11, a sliding component 26 is placed onto the screw thread 24 of the traction rod 18. The sliding component 26 is produced from a plastic which has good sliding properties, and comprises a stem part 27 having a round cross section and extending through the slot 11 between the limbs 7 and 8. It also contains a head part 28 of a particular design: the head part 28 initially rests with two sliding surfaces 29 on the slideways 12 and 13 next to the slot 11. The sliding surfaces 29 have the same curvature as the slideways 12 and 13 of the deflection 10 of the U-web 9, i.e., the same radius R10 and the same center point of the circle and the same axis Y—Y.

The sliding component 26 furthermore contains two lateral projections 30 and 31, the ends of which engage behind the U-web 9, i.e., behind the slideways 12 and 13, as fastening clips 32 and 33. In addition to the sliding surfaces 29 on the head part 28, the sliding component 26 also interacts via the stem part 27 in a sliding manner with the inner side wall surfaces of the slot 11. A certain lateral compensation of tolerances can be brought about via the projections 30 and 31 and via the fastening clips 32 and 33. The screw nut 25 is of self-locking design and lies with its lower section in a depression 34 of the sliding component 26.

When the device is actuated, i.e. when the parking brake is applied via the handbrake lever (not shown), the lever 6 pivots to the right about the axis X—X, and together with it the axis Y—Y, in the direction S. Correspondingly, the U-web 9 with the deflection 10 also pivots at the same time.

As a consequence of the tractive load on the traction rod 18, the sliding component 26 slides somewhat downward over the slideways 12 and 13, toward the axis of rotation X—X, i.e. decreases its distance HA from the axis of rotation X—X to the distance HE. At the same time, the guide cams 22 and 23 slide downward in the guide grooves 16 and 17 in the direction T.

The angle alpha of approximately 90° which is initially present between the effective lever length and the traction rod 18 is only about 30° in the maximum end pivoting position.

If the cable pulls 20 have stretched or a resetting of the cable actuation travel is necessary due to wear, and if in consequence the lever distance is too long, then, for resetting purposes, the screw nut 25 is screwed somewhat to the left onto the screw thread 24. This can be undertaken without a second tool for holding purposes, since rotation of the traction rod 18 in the shaped part 21 and rotation of the shaped part 21 between the limbs 7 and 8 of the lever 6 are not possible.

A sliding component 26 usually lasts over the lifetime of a car. If, nevertheless, an exchange of the sliding component 26 is required, this can easily be undertaken after removal of the screw nut 25: the fastening clips 32 and 33 can easily be bent away, the sliding component 26 removed and replaced by a new one.

What is claimed is:

1. A device for actuating a cable, comprising:
    a cable;
    a lever pivotable about an axis;
    a connecting device for connecting the cable in an extension-resistant manner to the lever at a distance from the axis, the distance being decreased by pivoting the lever, said connecting device including a traction rod having a variable length;
    a slideway arranged on the lever transversely to the traction rod and having a profile in the form of a curve;
    a sliding component for coupling the traction rod and the slideway;
    a device for reducing an effective length of the connecting device;
    a guide device arranged at the lever; and
    a shaped part for guiding the traction rod, said shaped part being coupled to the guide device, wherein the traction rod is guided in the shaped part so that the traction rod is longitudinally displaceable, but not rotatable relative to the shaped part.

2. The device as claimed in claim 1, wherein the device for reducing the effective length of the connecting device includes a screw thread interacting with a screw nut.

3. The device as claimed in claim 2, wherein the sliding component is penetrated by the screw thread and is held against the slideway by the screw nut.

4. The device as claimed in claim 2, wherein the sliding component has a recess for accommodating at least part of the screw nut.

5. The device as claimed in claim 2, wherein the screw nut is self-locking.

6. The device as claimed in claim 1, wherein the sliding component includes a sliding surface including a material having a low sliding friction.

7. The device as claimed in claim 1, further comprising a fastener provided at least on one of the slideway and the sliding component, said fastener preventing at least one of rotation and longitudinal displacement of the sliding component relative to the slideway.

8. The device as claimed claim 1, further comprising a second slideway and a slot dividing the slideway and the second slideway.

9. The device as claimed in claim 8, wherein the sliding component includes a first sliding surface and a second sliding surface, said first sliding surface interacting in a sliding manner with the slideway and the second slideway, and wherein said second sliding surface interacts in a sliding manner with the slot itself.

10. The device as claimed in claim 1, wherein the sliding component contains guide projections engaging laterally around the slideway, each of said guide projections having ends gripping behind the slideway as fastening clips.

11. The device as claimed in claim 1, wherein the curve of the slideway constitutes a part-circle.

12. The device as claimed in claim 1, wherein the sliding component has at least one sliding surface interacting with the slideway, the at least one sliding surface forming one of a curve and a part-circle, a curvature of said curve and/or a radius of said part-circle being not less than that of the slideway.

13. The device as claimed in claim 1, wherein the guide device for the traction rod has a profile congruent with the curved profile of the slideway.

14. The device as claimed in claim 1, further comprising a guide structure arranged on the shaped part, said guide structure being complementary to the guide device on the lever.

15. The device as claimed in claim 14, wherein at least one of the shaped part and the guide structure includes a slidable plastic.

16. The device as claimed in claim 14, wherein the lever includes limbs, wherein the guide device is arranged at an inside of each of said limbs, and wherein as the lever pivots, the guide device interact in a slidable manner with the guide structure of the shaped part while preventing the shaped part from rotating.

17. The device as claimed in claim 16, further comprising guide cams arranged at the shaped part and guide grooves arranged at the limbs, the guide cams engaging the guide grooves.

18. The device as claimed in claim 16, further comprising guide cams arranged at the limbs and guide grooves arranged the shaped part, the guide cams engaging the guide grooves.

19. The device as claimed in claim 1, wherein the lever has a U-shaped cross section.

20. The device as claimed in claim 19, further comprising a web arranged at the U-shaped lever, the slideway being situated on said web.

21. The device as claimed in claim 1, wherein the lever and the traction rod form an angle being approximately 90°+/−10° in a starting position and approximately 30°+/−5° in an end position.

22. The device as claimed in claim 21, wherein the device is part of a parking brake of a motor vehicle.

23. A parking brake, comprising,
    a brake actuating lever pivotable about an axis;
    a cable;
    a connecting device for connecting the cable in an extension-resistant manner to the brake actuating lever at a distance from the axis, the distance being decreased by pivoting the brake actuating lever in a brake actuating direction, said connecting device including a traction rod having a variable length;

a slideway running transversely to the traction rod and having a profile in the form of a curve, said slideway being arranged at the brake actuating lever;

a sliding component for coupling the traction rod and the slideway;

a guide device arranged at the brake actuating lever; and a shaped part for guiding the traction rod, said shaped part being coupled to the guide device, wherein the traction rod is guided in the shaped part so that the traction rod is longitudinally displaceable, but not rotatable relative to the shaped part.

* * * * *